(12) United States Patent
Burton et al.

(10) Patent No.: US 11,913,783 B1
(45) Date of Patent: Feb. 27, 2024

(54) GEOMETRY SENSOR FOR INLINE INSPECTION TOOL

(71) Applicants: Blake Kay Burton, Grantsville, UT (US); Arthur K. Fox, Murray, UT (US)

(72) Inventors: Blake Kay Burton, Grantsville, UT (US); Arthur K. Fox, Murray, UT (US)

(73) Assignee: Cypress In-Line Inspection, LLC, Tulsa, OK (US)

( * ) Notice: Subject to any disclaimer, the term of this patent is extended or adjusted under 35 U.S.C. 154(b) by 61 days.

(21) Appl. No.: 17/489,200

(22) Filed: Sep. 29, 2021

Related U.S. Application Data

(63) Continuation-in-part of application No. 16/953,626, filed on Nov. 20, 2020, now abandoned.

(60) Provisional application No. 62/939,059, filed on Nov. 22, 2019.

(51) Int. Cl.
| | | |
|---|---|---|
| *G01B 7/28* | (2006.01) | |
| *G01D 5/14* | (2006.01) | |

(52) U.S. Cl.
CPC ............. *G01B 7/281* (2013.01); *G01D 5/145* (2013.01)

(58) Field of Classification Search
CPC ................................ G01B 7/281; G01D 5/145
See application file for complete search history.

(56) References Cited

U.S. PATENT DOCUMENTS

| | | | |
|---|---|---|---|
| 4,045,738 A | 8/1977 | Buzzell | |
| 4,105,972 A | 8/1978 | Smith | |
| 6,640,655 B1* | 11/2003 | Manzak | F17D 5/00 |
| | | | 73/865.8 |
| 6,762,602 B1* | 7/2004 | Laursen | G01N 33/2045 |
| | | | 73/866.5 |
| 2004/0227509 A1* | 11/2004 | Ucan | G01V 15/00 |
| | | | 324/261 |
| 2008/0042646 A1* | 2/2008 | Burkhardt | G01N 27/82 |
| | | | 324/240 |
| 2010/0308809 A1* | 12/2010 | Houldley | B08B 9/0551 |
| | | | 324/220 |
| 2011/0103173 A1 | 5/2011 | May | |
| 2018/0196005 A1* | 7/2018 | Fanini | E21B 47/007 |
| 2019/0072522 A1* | 3/2019 | Desjardins | G01R 33/07 |
| 2021/0332930 A1* | 10/2021 | Tummapalli | F16L 55/44 |

FOREIGN PATENT DOCUMENTS

GB 2429254 2/2007

\* cited by examiner

*Primary Examiner* — Dominic E Hawkins
(74) *Attorney, Agent, or Firm* — Chad Hinrichs

(57) ABSTRACT

An improved geometry sensor for an inline inspection tool used for determining defects in a pipe or other conduit. The sensor having an arm pivotally mounted to a base on a body of an inline inspection tool and a spring biasing the arm away from the body of the inline inspection tool. A magnet mounted to the arm, the magnet having a magnetic field. A Hall effect sensor fixed relative to the body of the of the inline inspection. The outer end of the arm moves along an interior surface of a conduit as the tool passes through a pipe with the arm and magnet pivoting relative to the body and the Hall effect sensor detecting movement and deflection of the arm by measuring changes in the magnetic field.

9 Claims, 2 Drawing Sheets

GEOMETRY SENSOR FOR INLINE INSPECTION TOOL

PRIORITY CLAIM

The present application claims priority to and is a continuation-in-part application of U.S. non-provisional patent application Ser. No. 16/953,626 filed on Nov. 20, 2020 which claims priority to U.S. provisional patent application No. 62/939,059 filed on Nov. 22, 2019 entitled Improved Magnetic Flux Leak Inline Inspection Tool both of which are incorporated herein by reference.

FIELD OF THE INVENTION

The present invention relates generally to inline inspection of pipelines and other conduits. More particularly, the present invention relates to improvements to an inline inspection tools that use a special arrangement of an arm, magnet and Halle effect sensor to locate geometric defects in pipelines and other conduits.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
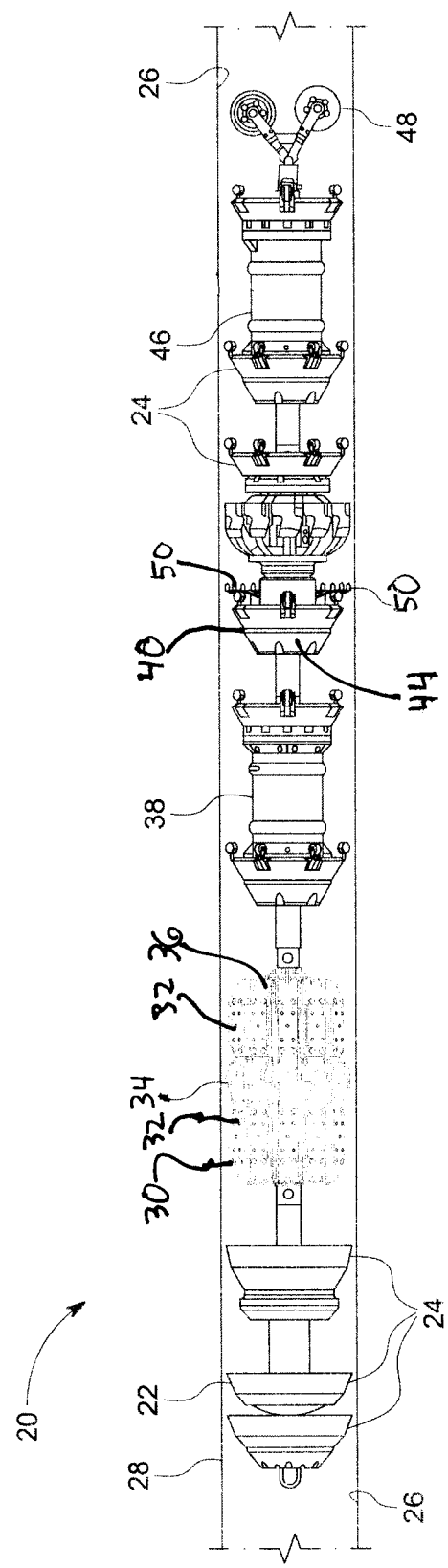
FIG. 1 is a diagram of a typical inline inspection tool of the present invention.
Figure 2:
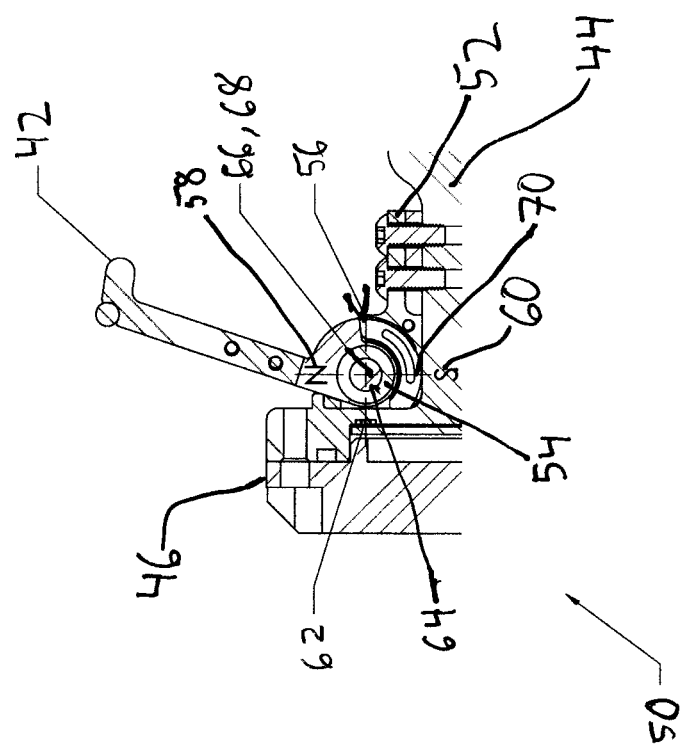
FIG. 2 a side view of the preferred embodiment of the geometry sensor.

In the preferred embodiment of the present invention the magnetic flux leakage (MFL) inline inspection tool 20 has several sections, as best seen in FIG. 1. The first section is the tow 22. It has a plurality urethan vanes, commonly called cups 24. The cups 24 extend radially outward from the outer circumference of the tow 22 and create a loose seal between the tow 22 and the interior wall 26 of the pipe 28. This seal allows the fluid in the pipe 28 to move the tool 20 along the pipe 28 as the fluid is conveyed through pumping or compression action. It should be noted the fluid in the pipe 28 could be a gas or a liquid. Other sections of the tool 20 may also be equipped with cups 24.

The second section of the tool 20 is the magnetizer 30 this is the section of the tool 20 which carries the magnets 32. The magnets 32 create the magnetic field in the pipe 28. The Hall effect sensors 34 measure the magnetic field in the pipe 28 and search for magnetic field leakage caused by defects such as cracks, pitting and dents in the pipe 28. The magnetizer 30, the array of Hall effect sensors 34 and the sensor arms 36 are discussed in greater detail below.

The third section of the tool 20 is the data collection and battery section 38. Data from the sensors 34 on the magnetizer 30 and the geometry sensor 40 are further processed and stored here.

The fourth section of the tool 20 is the geometry sensor 40. It has a plurality of arms 42 which extend from the body 44 of the tool 20 and determine the interior diameter of the pipe 28. This is used to locate dents in the pipe 28 and sections which are out of round. The details of the geometry sensor 40 are further explained below.

The fifth section of the tool 20 is the inertial mapping unit or IMU 46. It has micro processing capability and batteries which provide power for the operation of the tool 20. The primary purpose of the IMU 46 is to calculate data and correlate the location of the tool 20 in the pipeline 28 with the location of defects.

The sixth section of the tool 20 is the odometer 48. It measures the distance the tool 20 has traveled and provides related data to the IMU 46.

It should be noted the order of the sections of the tool 20 are mentioned above for ease of description and explanation. The exact order of the sections may vary. It may be possible to have a tool 20 without one of the fore mention sections and still fall within the scope of protection of this patent. Further the tool is typically used to inspect pipelines, however it can also be used to inspect other conduits and pipe. Thus the term pipe, pipeline and conduit used in this patent should be considered interchangeable.

The preferred embodiment of the present invention has a geometry sensor section 40 with a plurality of geometry sensors 50 located around the outer circumference of the geometry sensor section 40. The geometry sensors 50 locate where the pipe 28 has a dent or is out of round. Each geometry sensor 40 has an arm 36 which extends radially outward from the geometry sensor section 40 and contacts the interior wall 26 of the pipe 28. In the preferred embodiment the geometry sensor 50 has a base 52. The arm 36 is pivotally attached to the base 52. If there is a dent the arm 36 is moved radially inward towards the center of the geometry sensor section 40. This arm movement is pivotal relative to the geometry sensor section 40 and the base 52.

A magnet 54 is mounted on the arm 36, at or near the pivotal connection to the base 52. The magnet 54 has a magnetic field 56 with a north and south pole 58 and 60. A Hall effect sensor 62 is mounted on the geometry sensor section 40. In the preferred embodiment it is mounted on the base 52. The Hall effect sensor 62 measures the magnitude of the arm's 36 movement based on changes in the magnetic field 56 as the magnet 54 rotates with the arm 36. These changes in the field indicate how many degrees the arm 36 rotates when it hits a dent. This information along with the length of the arm 36, diameter of the geometry sensor section 40, diameter of the pipe 28 and pipe wall thickness are used to determine the size of a dent as well as impact on the structural integrity.

In the preferred embodiment the magnet 54 has an annular or doughnut shape. The north and south poles 58 and 60 are located on opposing sides of the hole 64 on an axis 70 that runs perpendicular to the axis 66 of the hole 64 passing through the magnet 54. Further, in the preferred embodiment the axis of rotation 68 of the arm 36 is aligned with the axis 66 of the hole 64 passing through the magnet 54. This means the axis of rotation 68 of the arm 36 is also perpendicular to the axis 70 between the north and south poles 58 and 60 of the magnet 54.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A geometry sensor for pipeline inline inspection tool, said geometry sensor comprising:
   an arm pivotally mounted to a body of the inline inspection tool;
   a magnet mounted to the arm, the magnet having an annular shape with a hole having an axis centered in the hole and a magnetic field having a north pole and a south pole located on opposing sides of the hole on an axis that runs perpendicular to the axis centered in the hole;
   an axis of rotation of the arm aligned with the axis centered in the hole; and
   a Hall effect sensor fixed relative to the body of the of the inline inspection;
   wherein an outer end of the arm moves along an interior surface of a conduit as the tool passes through the conduit with the arm and magnet pivoting relative to the body and the Hall effect sensor can detect movement in the magnetic field and the axis of rotation of the arm is perpendicular to the axis between the north and south poles.

2. The geometry sensor of claim 1 further comprising:
   a base mounted on the body of the inline inspection tool.

3. The geometry sensor of claim 2 further comprising:
   a pivoting joint mounted to the base and arm
   wherein the pivoting joint allows the arm to pivot relative to the base.

4. The geometry sensor of claim 1 further comprising:
   a spring biasing the arm to rotate away from the body.

5. A geometry sensor section of pipeline inline inspection tool, said geometry sensor section comprising:
   a plurality of geometry sensor located around the outer circumference of the geometry sensor section;
   each geometry sensor has an arm pivotally mounted to a body of the inline inspection tool, a magnet mounted to the arm, the magnet having an annular shape with a hole having an axis centered in the hole and a magnetic field having a north pole and a south pole located on opposing sides of the hole on an axis that runs perpendicular to the axis centered in the hole, and an axis of rotation of the arm aligned with the axis centered in the hole; and a Hall effect sensor fixed relative to the body of the of the inline inspection;
   wherein an outer end of the arm moves along an interior surface of a conduit as the tool passes through the conduit with the arm and magnet pivoting relative to the body and the Hall effect sensor can detect movement in the magnetic field and the axis of rotation of the arm is perpendicular to the axis between the north and south poles.

6. Each geometric sensor of claim 5 further comprising:
   a base mounted on the body of the inline inspection tool.

7. Each geometric sensor of claim 6 further comprising:
   a pivoting joint mounted to the base and arm
   wherein the pivoting joint allows the arm to pivot relative to the base.

8. Each geometric sensor of claim 7 further comprising:
   a spring biasing the arm to rotate away from the body.

9. A geometry sensor for pipeline inline inspection tool, said geometry sensor comprising:
   an arm pivotally mounted to a base on a body of an inline inspection tool the arm having an axis of rotation;
   a magnet mounted to the arm, the magnet having an annular shape with a hole having an axis centered in the hole, and a magnetic field having north pole and a south pole located on opposing sides of the hole on an axis that runs perpendicular to the axis centered in the hole;
   a Hall effect sensor fixed relative to the body of the of the inline inspection;
   a pivoting joint mounted to the base and arm; and
   a spring biasing the arm to rotate away from the base;
   wherein an outer end of the arm moves along an interior surface of a conduit as the tool passes through the conduit with the arm and magnet pivoting relative to the body and the Hall effect sensor can detect movement in the magnetic field and having north pole and a south pole located on opposing sides of the hole on an axis that runs perpendicular to the axis centered in the hole.

* * * * *